April 7, 1931.  H. E. GOODWIN  1,799,624
SHEARS
Filed Jan. 26, 1929
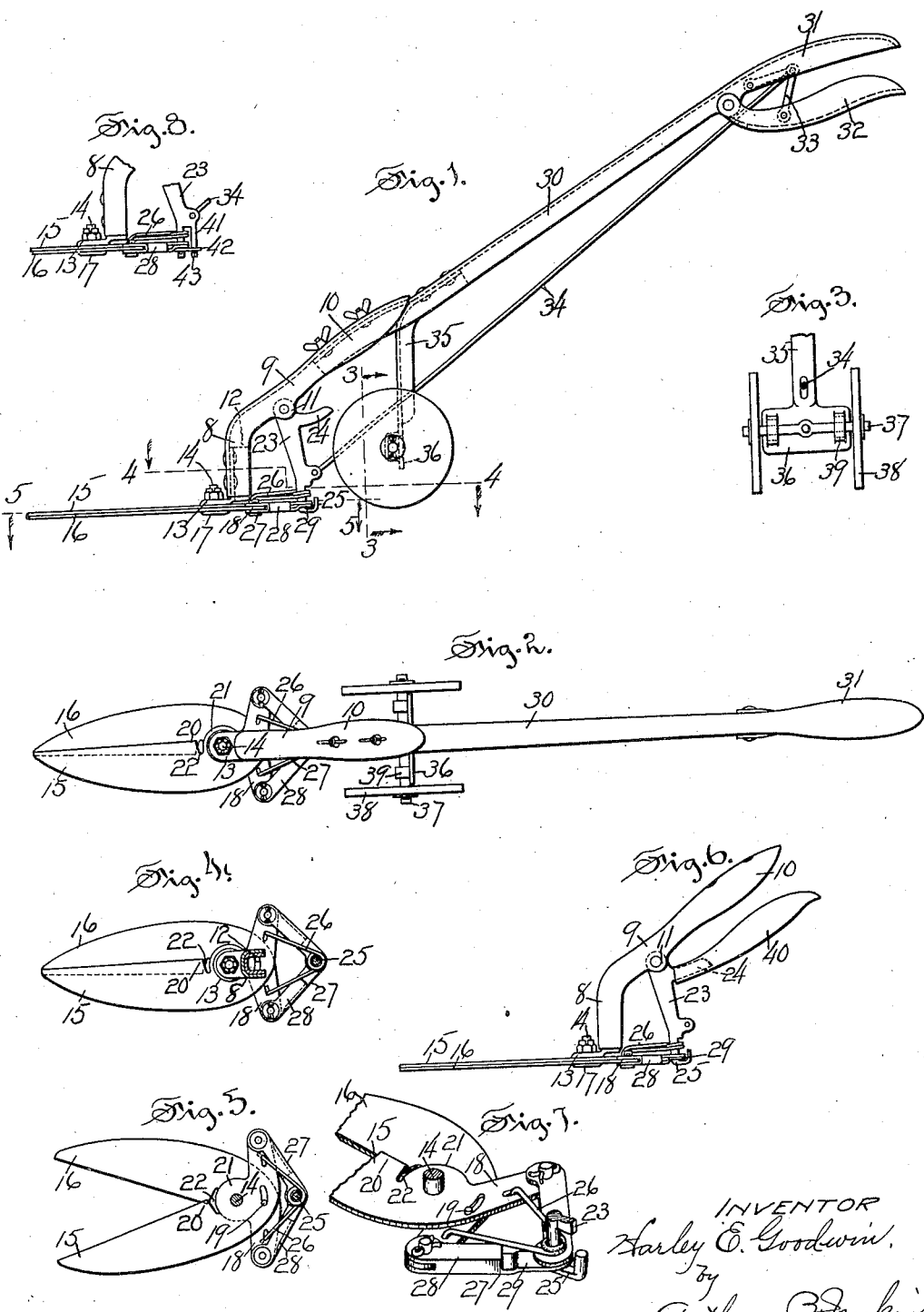
INVENTOR
Harley E. Goodwin
by
Arthur B Jenkins
ATTORNEY Patented Apr. 7, 1931

1,799,624

UNITED STATES PATENT OFFICE

HARLEY E. GOODWIN, OF HARTFORD, CONNECTICUT, ASSIGNOR TO THE GOODWIN MANUFACTURING COMPANY, OF HARTFORD, CONNECTICUT, A CORPORATION OF CONNECTICUT

SHEARS

Application filed January 26, 1929. Serial No. 335,216.

My invention relates more particularly to that type of shears which are used for cutting grass for trimming purposes and especially along borders, and an object of my invention, among others, is to provide an implement of this kind that shall be particularly durable, comparatively inexpensive to make, and which shall be easy and convenient to handle and operate.

One form of a pair of shears embodying my invention, and in the construction and use of which, the objects herein set out, as well as others, may be attained, is illustrated in the accompanying drawings, in which—

Figure 1 is a side view of my improved shears.

Figure 2 is a top view of the same, the shears being shown as closed.

Figure 3 is a rear view illustrating the supporting mechanism for the shears.

Figure 4 is a view in section on a plane denoted by the dotted line 4—4 of Figure 1.

Figure 5 is a view in section on a plane denoted by the dotted line 5—5 of Figure 1, the shears being shown as open.

Figure 6 is a side view illustrating the instrument equipped as hand shears.

Figure 7 is a detail view illustrating the connection or toggle members between the shear blades and operating lever.

Figure 8 is a detail view illustrating a modified form of attachment of the toggle members to the blade operating lever.

My improved implement in its general construction embodies a support for pivoted blades, for blade actuating members, and for extension members, and this support embodies a leg 8 at its lower end, a body 9 extending at an angle from said leg and terminating in a handle 10. This support is of trough shape and may be formed in any suitable manner and in use is disposed with its closed side outward. The side portions of the body are formed with ears 11.

A tang 12, also of trough shape, is fitted to and secured within the leg 8 and this tang has an angularly disposed foot 13 that serves as a blade support. This foot is preferably of disc shape and it has a hole for a pivot bolt 14 that extends through shear blades 15 and 16, and by means of which bolt, the blades are pivotally secured in place. The head 17 of the bolt is comparatively large, relatively of a size equal to that of the foot 13 and said head may be concave on its under side.

Each of the blades has shanks 18 extending at nearly a right angle thereto and one of the blades has a slot and the other blade has a stop pin 19 extending into said slot, said slot being of a length to limit the opening and closing movements of the blades. This stop device is so arranged that the heels 20 of the blades will always remain in contact and these heels are spaced from ears 21 to create an opening 22 when the blades are closed, and as shown in Figures 2 and 4 of the drawings.

A pendant blade operating lever 23 is pivotally attached to and between the ears 11, this lever having a horn 24 near its upper end and a hook 25 at its outer end. A torsional spring is coiled two or more times around the shank of the hook 25, the branches 26 of the spring extending into slots in the shanks 18 of the shear blades, the ends of the branches being bent downwardly into said slots and then at an angle to underlie the shanks, and as shown in Figure 5 of the drawings. This spring acts to force the blades to their open positions.

The lever 23 is connected with the outer ends of the shanks 18 of the shear blades by a toggle or knee joint comprising two toggle members 27 of similar or like construction. In order that the pull upon each blade shall be substantially parallel with the plane of the blade, and through the center thereof, each member or link is folded at one end, the shank of the shears being received between the folds and being pivotally attached thereto. The folded portion 28 terminates short of the other end of the link and such other end 29 is offset to bring its end substantially in a plane passing centrally between the two folds of the opposite end of the link.

A handle extension 30 is removably attached to the handle 10 as by means of bolts and thumb nuts, the outer end of this extension being formed into a grip 31. This extension and grip are also preferably of trough shape and the lower end fits within the handle 10.

An actuating lever 32 is pivotally attached to said extension underneath the grip 31 and is connected with said grip by means of a toggle and knee joint comprising two members 33 pivotally attached at their ends to the grip and lever and pivotally connected at their inner ends. An actuating rod 34 is attached to the pivot connecting the members of this knee joint, the opposite end of said rod being pivotally attached to the lever 23. By means of this connection the lever 32 is made use of, when the extension is employed, to operate the shear blades.

In order to provide for easy movement of the instrument along a surface to be operated upon, and particularly to enable the shear to be placed in various positions, and thereby be adjusted to suit various conditions that occur in the operation of the shears I provide a rolling support so attached to the instrument that the shears may be tilted to suit the requirements of the operator. This attachment comprises a post 35 secured at its upper end within the extension 30. This post is also preferably of trough shape except at its lower end where it is flattened into a supporting plate 36. An axle 37 is pivotally attached at its center to this supporting plate and wheels 38 are rotatably mounted at the ends of the axle. This axle extends through guides 39 formed in any desirable manner on the supporting plate 36, or they may be separately formed and attached thereto. These guides have openings of sufficient length to permit a tipping or careening movement of the instrument on the axle and wheels to permit such instrument to be adjusted to suit irregularities of a border or other edge being trimmed.

In that form of the implement shown in Figure 6 the extension handle and the wheeled support are dispensed with, it being noted that said extension handle and parts supported thereby including the actuating rod 34 have been removed. A removable handle 40 having a socket to receive the horn 24 is secured, as by means of said horn, to the operating lever 23, and the handle or grip-formed portion of the body 9 is made use of in connection with the handle member 40 for operating the shear blades.

In that form of the device shown in Figure 8 the spring 26 and toggle members 27 are supported at the end of the lever 23, but instead of a hook, a branch 41 is formed spaced from the part directly supporting said spring and toggle members and a washer 42 comprising a retainer is placed upon the branches and is held in place as by means of pins 43.

I claim:

1. A shearing implement including a trough shaped supporting leg, a body disposed at an angle to said leg, a supporting foot having an angularly arranged tang of trough shape to fit said leg, a pair of blades pivotally attached to said foot, an operating lever pivotally attached to said body and operatively connected with said blades, and means for operating said lever.

2. A shearing implement including a supporting leg, a body disposed at an angle to said leg, a supporting foot supported by and disposed at an angle to said leg, a pair of blades pivotally attached to said foot, said blades being shaped to create a hole at the heel thereof in proximity to the pivot, an operating lever pivotally attached to said body and operatively connected with said blades, and means for operating said lever.

3. A shearing implement including a blade supporting member, a pair of blades pivotally attached to said member, shanks projecting angularly from said blades, the shank of each blade projecting across the remaining blade, a blade operating lever pivotally attached to and depending from said blade supporting member, a toggle connection including two toggle members pivoted at their meeting ends to said blade operating lever and pivotally connected at their opposite ends to said shanks, and means for operating said lever.

4. A shearing implement including a blade supporting member, a pair of blades pivotally attached to said member, shanks projecting angularly from said blades, the shank of each blade projecting across the remaining blade, a blade operating lever pivotally attached to and depending from said blade supporting member, means for limiting opening movement of said blades with the heels thereof lapping one past the other, and a connection between said operating lever and said blades for operation of the latter.

5. A shearing implement including a blade supporting member, a pair of blades pivotally attached to said member, shanks projecting angularly from said blades, the shank of each blade projecting across the remaining blade, a blade operating lever pivotally attached to and depending from said blade supporting member, a toggle connection including two toggle members pivoted at their meeting ends to said blade operating lever and pivotally connected at their opposite ends to said shanks, a spring coiled around the pivoted end of said operating lever and having branches diverging and loosely engaged with said shanks, and means for operating said lever.

6. A shearing implement including a blade supporting member, a pair of blades pivotally attached to said member, shanks projecting from said blades, the shank of each blade projecting across the remaining blade, a blade operating lever pivotally attached to and depending from said blade supporting member, a toggle connection including two toggle members each of which has an overlapped end pivotally attached to one of said shanks with the shank entered between said overlapping parts, each of said toggle members being pivotally attached to said operating lever, and means for operating said lever.

7. A shearing implement including a blade supporting member, a pair of blades pivotally attached to said member, a blade operating lever pivotally attached to and depending from said blade supporting member, a hook formed at the free end of said blade operating lever, connecting members pivotally engaged with the operating lever within said hook and extending to and pivotally attached to said blades, and means for operating said lever.

8. A shearing implement including a blade supporting member, a pair of blades pivotally attached to said member, a blade operating lever pivotally attached to and depending from said blade supporting member, an operative connection between said lever and said blades for operation of the latter, an actuating lever pivotally secured at the end of said supporting member, a knee joint comprising two members pivoted at their meeting ends and pivotally attached to said supporting member and actuating lever, and an actuating rod pivotally attached at the knee of said joint at one end and pivotally attached to said operating lever at its opposite end.

9. A shearing implement including a blade supporting member, a pair of blades pivotally attached to said member and having angularly projecting shanks, a blade operating lever pivotally attached to and depending from said supporting member, a toggle connection including two toggle members pivotally attached at their meeting ends to said operating lever and at their opposite ends to the ends of said shanks, an actuating lever pivotally attached to said supporting member, a pair of toggle members pivotally connected at their meeting ends and pivotally attached at their opposite ends to said supporting member and said actuating lever, and a connecting bar pivotally connected at one end to a joint of said toggle connections and at its opposite end to said operating lever.

10. A shearing implement including a supporting leg with a body projecting at an angle therefrom and terminating in a hand grip formed end, a pair of blades pivotally attached to said leg, an operating lever pivotally attached to and depending from said body, an operative connection between said lever and said blades for operation of the latter, a horn projecting from said lever for attachment thereto of a handle member, and means on the grip-formed portion of said body for removable attachment thereto of a handle extension.

11. A shearing implement including a blade supporting member, a pair of blades pivotally attached to said member, a blade operating lever pivotally attached to and depending from said blade supporting member, and terminating in two spaced parts, connecting members pivotally attached to one of said parts and extending to and being pivotally attached to said blades, and means connecting said parts to retain said connecting members in place.

12. A shearing implement including a blade supporting member, a pair of blades pivotally attached to said member, a blade operating lever pivotally attached to and depending from said blade supporting member and terminating in two spaced members having an opening at the free end thereof, connecting members pivotally attached to one of said parts and extending to and being pivotally attached to said blades, and a pin removably attached to said parts to close the opening at the end thereof to retain said connecting members in place.

HARLEY E. GOODWIN.